ID

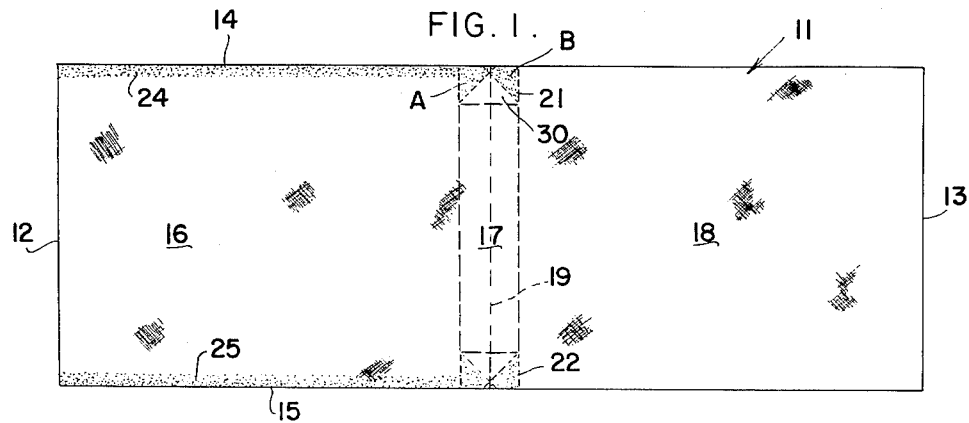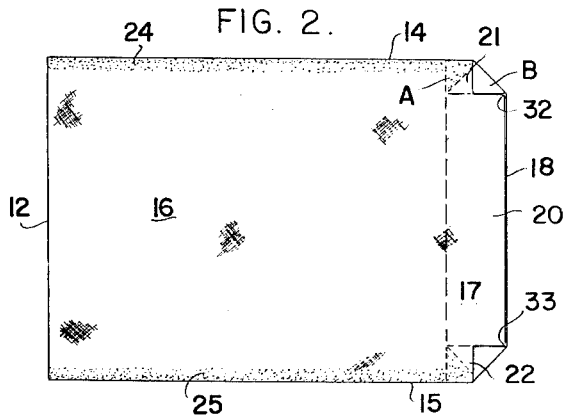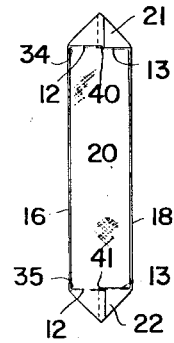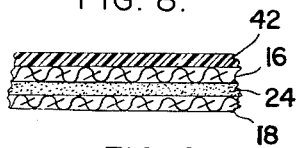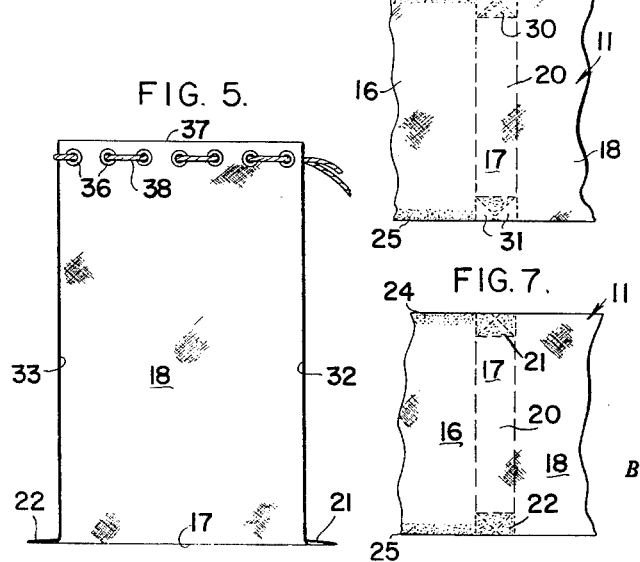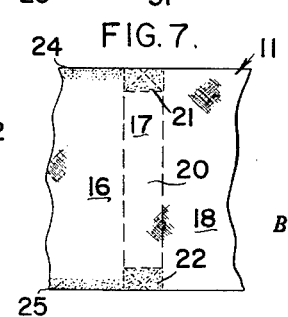

United States Patent Office 2,999,521
Patented Sept. 12, 1961

2,999,521
POUCH AND METHOD OF MAKING SAME
Joseph J. Bono, Wauwatosa, and Cyril J. Roos, Cedarburg, Wis., assignors to American Heat-Seal, Inc., Milwaukee, Wis.
Filed Aug. 5, 1959, Ser. No. 831,835
8 Claims. (Cl. 150—13)

The present invention relates generally to the manufacture of pouch containers and more particularly to improved methods and unique structures for the manufacture of pouch containers of the type used by the United States Post Office Department to transport letter and parcel mail from station to station.

The pouches now used by the Post Office Department have been found deficient in many respects. For example, the original cost of those pouches, notwithstanding the fact that much of the labor involved in making them is provided by inmates of Federal penitentiaries, is about twice that of the pouch of the present invention. Additionally, those pouches, which are subjected to a great deal of dragging because they are frequently too heavy to lift, wear rapidly and have extremely low abrasion resistance. Still further, the repair of those pouches when worn requires weaving, either by hand or with special weaving machines, which results in high maintenance costs. Furthermore, those pouches, upon failure of but a few critical threads, must promptly be removed from service because if they are not, they are guilty of trapping pieces of mail in their loose seams thereby possibly causing serious delays in the delivery of important mail.

Altogether, the high original costs, the short service life with its attendant repair costs, and the temporary "loss" of mail in the seams of those pouches have caused the Postal Department to request industry to give serious consideration to the development of new methods and designs for the manufacture of mail pouches.

The present invention is the result of a conscientious and successful effort to assist the Postal Department by developing methods and designs for the manufacture of mail pouches which obviate the serious disadvantages attendant the use of the prior pouches and comprises the utilization of uncalendered fabrics which are strategically coated with special heat responsive formulations, manipulated in accordance with a unique folding sequence, and subsequently press-heated in certain specified regions to a temperature sufficient to activate the formulation thereby providing a unique integral pouch structure in which the interior storage space defines a completely uniform parallelepipedon having no separable seams.

Accordingly, one of the prime objects of the present invention is to provide improved methods and unique structures for the manufacture of mail pouches which substantially completely eliminate all of the disadvantages attendant the pouches now used by the United States Post Office Department.

Another object of the present invention is to provide new and improved methods and structures for the manufacture of mail pouches in which the strategic zone coating of an uncalendered fabric with a heat activatable adhesive composition followed by the especial manipulation and processing thereof provides a strong tight rectangular bottomed pouch having no detachable edges or separable seams into which pieces of mail can be "lost."

Still another object of the present invention is to provide an improved mail pouch having longer service life and enhanced abrasion resistance than those currently used by the Postal Department.

A still further object of the present invention is to provide a new mail pouch in which certain fabric portions are securely bonded in complete surface to surface engagement with each other to provide a unique mail pouch having, integrally formed therewith, a firm virtually indestructable handle means whereby the mail pouch may be readily inverted and its contents dumped therefrom.

Another object of the present invention is to provide a new method of manufacturing mail pouches in which a heat responsive adhesive formulation is strategically employed in easily handled sequence at nonactivating temperatures and is subsequently activated by the application thereto of a temperature of activating magnitude.

These and still further objects as shall hereinafter appear are readily fulfilled to an unexpectedly remarkable extent by the present invention as will be discerned from the following detailed description of exemplary embodiments thereof, particularly when rear in conjunction with the accompanying drawing in which:

FIG. 1 is a plan view of a fabric blank strategically coated with an inactive heat-actuable adhesive composition in accordance with the present invention;

FIG. 2 is a further view of the blank of FIG. 1 after one end portion thereof has been folded 90° to define one side of a pouch embodying the present invention;

FIG. 3 is a further view of the blank of FIGS. 1 and 2 after the other end portion thereof has been folded 90° to define another side of the pouch and integral handle means in accordance with the present invention;

FIG. 4 is an enlarged fragmentary view of a portion of the bottom of the pouch of FIG. 3 (turned 90° into the page) showing intergrally bonded handle means made in accordance with the present invention;

FIG. 5 is a side elevation of a mail punch embodying the present invention showing grommets and tie cord in operative position;

FIG. 6 is a fragmentary plan view of an uncalendered fabric blank strategically coated in accordance with an alternative embodiment of the present invention;

FIG. 7 is a fragmentary plan view of an uncalendered fabric blank strategically coated in accordance with another modification of the present invention; and FIG. 8 is a fragmentary showing of a pouch embodying still another aspect of the present invention.

Referring to the drawing, an uncalendered rectangular fabric blank is identified by the reference numeral 11. Blank 11 is formed of a material characterized by good tensile properties such, for example, as canvas, nylon, treated cotton and the like. Blank 11 is bounded by ends 12, 13 and sides 14, 15.

For purposes of this description, blank 11 which is an integral fabric sheet, will be considered as apportioned into three sections 16, 17 and 18 (see FIG. 1). Section 16 is the rectangular section adjacent the left (relative to FIG. 1) end 12 of blank 11. Section 17 is the central section and section 18 is the rectangular section adjacent the right (relative to FIG. 1) end 13 of blank 11. Both sections 16 and 18 extend axially inwardly from ends 12, 13 respectively into contiguous relationship with section 17. Section 17 is disposed generally symmetrically about a line 19 established midway between and generally parallel to ends 12, 13. Line 19 is thus the vertical centerline of blank 11. Section 17 is thus bounded by the central portion of sides 14, 15 and sections 16, 18.

As a further aid to understanding the present invention, section 17 (as shown in FIG. 2) will be considered as being further sub-divided into three portions, a major or central portion 20, and two minor portions 21, 22 contiguous with edges 14, 15, respectively.

Each of the minor portions 21, 22 are generally rectangular in shape and for reasons which shall hereinafter become apparent may be considered to comprise a first half A, lying between line 19 and section 16, and a second half B, lying between line 19 and section 18.

In one practice of the present invention, integral blank 11, thus apportioned and subdivided, is processed as follows:

One of the end sections, for example, section 16 is coated with a thin strip of about 2–3 inches in width of a suitable heat sealable adhesive formulation at each edge thereof. Thus one, strip 24, lies adjacent to and runs along edge 14 of section 16 while a second, strip 25, lies adjacent to and runs along edge 15 of section 16. In the example described, the edges of section 18 are not coated. If desired, however, one or both edges of section 18 could be provided with a strip as described while the corresponding strip, i.e., the strip adjacent the same edge of the blank 11 in section 16, could be omitted.

Referring now to minor portions 21, 22 of section 17, the unique method of zone coating these portions will now be described.

As previously mentioned, each minor portion, for example portion 21, is considered as consisting of two halves, A and B, interposed between line 19 and sections 16 and 18, respectively. Each half, for example half A, may further be considered as containing two generally right triangular quarters, one having its base contiguous with the adjacent end of central portion 20 and the second having its base upon the longitudinal extension of the inner edge of strip 24. The remainder of half 21–A, that is, that small rectangular portion of 21–A which would be covered by strip 24 if strip 24 were extended thereacross, will be considered as a part of this latter triangle. Thus, while the respective halves do not divide precisely into two triangles, one of the triangles having the small rectangular portion described above appended to its base; for purposes of this description the respective halves will be so considered and herein described.

It will be noted that the triangle based upon portion 20 and bounded by line 19 forms a substantially isosceles triangle with the corresponding triangle in half B, that is, the triangle also having its base upon the adjacent end of central portion 20 and bounded by line 19. This isosceles triangle is herein called a "zone" and indicated in FIG. 6 by the reference character 30. The two remaining triangles in portion 21, that is, those outboard of triangle 30, form a second zone indicated at 31, in FIG. 6.

Three methods of coating portions 21, 22 have been practiced with excellent results. One, illustrated in FIGS. 1, 2 and 3, consists of doctor blading or otherwise coating a layer of heat sealable adhesive onto zone 31 while leaving zone 30 uncoated. In this practice, the adhesive should be disposed in a layer of from about 2 to about 4 mils thick when blank 11 is formed of a thin fabric such, for example, as cotton, linen and the like, and from about 5 to about 7 mils thick when blank 11 is formed of a thick fabric such, for example, as canvas. It should be noted that these same thicknesses are applicable in depositing strips 24, 25 as previously described.

A second coating pattern is illustrated in FIG. 6 and consists of coating zone 30 with the heat sealable adhesive composition while leaving zone 31 uncoated.

A third coating pattern is illustrated in FIG. 7 and consists of coating the entire portion, that is, both zone 30 and zone 31, with a layer of the heat sealable adhesive composition having a thickness of about half that described for the previous techniques, i.e., about 1 to 2 mils for thin fabrics and from about 2 to about 4 mils for thick fabrics.

The full significance of these special coating patterns will be more fully explained hereinafter in connection with the description of our unique manipulation of blank 11 to form the new pouch. It should be noted, however, that all of the coating patterns provide a full and complete layer of heat sealable adhesive between zone 30 and zone 31 when, as shown sequentially in FIGS. 2 and 3, zone 31 is folded over zone 30 to define a generally triangular fold. Thus an important feature of this invention is that at least about half of portions 21, 22 are provided with a layer of heat sealable adhesive so that a firm and complete surface to surface bond may subsequently be achieved when the portions are folded as shall be described.

A folding sequence whereby blank 11, coated with an adhesive as indicated, is formed into a secure integral mail pouch having a parallelepipedon chamber and handle means integrally formed therewith, shall now be described. The folding sequence may be performed either mechanically or manually.

The fabric blank 11, after being coated in accordance with the previous description, may first be folded along the common edge between sections 17 and 18 until the plane of section 18 is substantially normal to the plane of section 17. In executing this fold, halves of portions 21 and 22 disposed between the fold and line 19, designated by the letter "B," are folded across the dotted oblique line shown passing therethrough in FIGS. 1, 6 and 7 so that each of the triangle-like portions of the respective "B" halves which employ an outer edge of blank 11 as their base respectively overlap the adjacent one of the triangular portions of the respective "B" halves which employ an edge of center portion 20 as their base. See FIG. 2. The application of pressing heat to these folds at a temperature sufficient to activate the heat responsive adhesive formulation interposed therebetween activates the adhesive and provides a tenacious complete surface to surface engagement between the lapped parts.

In executing this first fold, edges 14, 15 of section 18, which now lie generally normal to section 17, are bent into and form generally square corners, as at 32 and 33 in FIGS. 2 and 5, which conform to and extend upwardly from the corresponding corners of portion 20. The blank 11 of FIG. 1 has now assumed the appearance depicted in FIG. 2.

The next operation, if executing this procedure manually (if mechanical means are employed, this operation may be performed substantially simultaneously with the previous operation), is to fold blank 11 along the common boundary between sections 16 and 17 until the plane of section 16 is also generally normal to the plane of section 17. In executing this fold, the outboard "triangles" of halves A of portions 21 and 22 of section 17 are lapped over the inboard triangles of halves A and provide a slight overlap of the previous fold as shown in FIGS. 3 and 4.

In making this fold, the edges 14, 15 of section 16, which now lie generally normal to section 17, are bent into and form generally square corners, as at 34 and 35 in FIG. 3, which conform to and extend upwardly from the corresponding corners of portion 20. Further, in making this fold, the coated edges of section 16, that is, strips 24 and 25, lap over and are pressed to the corresponding edges of section 18 where, upon the application of heat at a temperature sufficient to activate the adhesive, a completely integral seam is formed therebetween. Similarly, the last described corner fold overlaps slightly and is pressed to the first described corner fold to form a generally isosceles triangle which is pressed and heated to a temperature sufficient to activate the adhesive to form a completely integral surface to surface engaging bond therebetween.

Thus executed, portion 20 becomes the rectangular bottom of a pouch and the heat activated adhesive bond in the corner folds and in the lap seams provides a complete integral tenaciously formed parallelepipedon container having no breaks into which letters may be "lost." Furthermore, the corner folds protruding from each end of the bag bottom provide strong easily grasped handles for inverting the pouch and emptying its contents.

To provide the pouch so that it may be closed and tied if desired, suitable grommets 36 may be disposed adjacent the upper edge of the new pouch 37 and a suitable tie cord 38 strung therethrough as shown in FIG. 5.

The corner fold structure, that is, the handle means created by the strategic coating and folding of portions 21, 22 is shown in greater detail by enlarged section in FIG. 4.

Thus, as the respective folds are performed as previously described, the portions 21 and 22 are folded from their original rectangular shape into a triangular shape as shown in sequence of FIGS. 1, 2 and 3. In this triangular fold, the two fabric layers of the fold are integrally bonded together in complete surface to surface engagement by activation with heat of the layer of heat sealable adhesive generally uniformly spread on at least one of the opposed surfaces (see FIGS. 1, 2 and 6) that is, either zone 30 or zone 31, or, if desired, on both (see FIG. 7). This completely bonded triangular fold thus provides handle means for the pouch which simultaneously give portion 20 clean square corners as is especially apparent in FIG. 4.

In a similar manner, the lap joints or seams defined at the sides of the pouch indicated at 40, 41 are completely integrally bonded layers of fabric, one being of section 16 and the other of section 18, by the activation with heat of the corresponding strips 24, 25 of heat sealable adhesive generally uniformly spread at the edge of the inner surface of the overlapping section, which is illustrated as section 16.

In handling the fabric blanks 11 on a deck, as is the customary practice, it is preferred to coat all adhesive on the "up" side of the blank in order to minimize handling problems and to avoid contamination of the adhesive formulation.

As previously mentioned, a number of desirable fabrics are available for use in the practice of this invention although it is desirable and preferred that they be uncalendered so that the adhesive layer may properly impregnate the inter-fiber structure of the fabric and thereby achieve the desired intimate engagement between the engaging fabric surfaces.

As used herein, "heat sealable adhesive" and "heat responsive adhesive" define a formulation containing a plasticized polymer which, when heat activated, provides a bond capable of withstanding a pull of at least 10 pounds per inch width of strip, as tested on a Scott tensile strength machine or like apparatus.

It is found that formulations having a sealing temperature of about 375° to about 425° F. and which attain their maximum tensile strengths in this temperature range are preferred. Of course, as is known, the sealing temperature of a heat sealable adhesive is dependent on time as well as temperature with an operation at a lower temperature requiring a greater time for sealing.

One class of adhesives found particularly satisfactory in the practice of this invention is plasticized polyvinyl chloride. It is generally preferable that the plasticizer so employed with the vinyl chloride adhesive be of the non-extractable type.

One particularly suitable adhesive of this type consists of polyvinyl chloride and polyester plasticizer formed into a jell having a fusion temperature, that is, the temperature at which the formulation becomes adhesive, of about 360° to about 410° F. Formulations having a fusion temperature in this range are particularly desirable because these temperatures are higher than the temperature reached by any of the conventional cleaning and laundry processes which might be employed to clean the pouch. Thus, unintentional destruction of the pouch is precluded.

The plasticized polymers are further desirable for the physical properties which they impart to the pouch structure. For example, the plasticized polyvinyl chloride formulations, which after fusion and cooling provide a tenacious, tough, strong, flexible bond between the selected portions of the pouch, are also found to be not only resistant to water but also resistant to severe chemicals such for example, as cleaning fluids and detergents and others of the type used in cleaning and laundry processes.

To aid in a more complete understanding of the present invention, the following examples of adhesive organosol formulations are presented as they exemplify those which may be employed in the practice of this invention.

*Example 1*

| | Parts by weight |
|---|---|
| Polyvinyl chloride | 55 |
| Polyester (R–2H) | 45 |
| Stabilizer (12–V–6) | 2 |
| Solvent | 5 |

*Example 2*

| | |
|---|---|
| Polyvinyl chloride | 60 |
| Epoxy (Admex 711) | 40 |
| Stabilizer (12–V–6) | 2 |

*Example 3*

| | |
|---|---|
| Polyvinyl chloride | 70 |
| Dioctyl phthalate | 30 |
| Disobutyl ketone | 3 |
| Stabilizer (12–V–6) | 2 |

In the foregoing, the polyester R–2H is a high-molecular-weight polyester which is a nonvolatile extraction resistant plasticizer for vinyl chloride resins made by the Carbide and Carbon Chemical Company, New York, New York, and sold under the trade designation of "Flexol R–2H." The stabilizer "12–V–6" is a barium-cadmium complex described as an "8.6 barium 6.7 cadmium liquid alkyl aryl phosphite complex" and made by the Harshaw Chemical Company, Cleveland, Ohio. The solvent is an aliphatic hydrocarbon such, for example, as Apco thinner, a petroleum hydrocarbon having an initial boiling point of 242° F., 50% distillation at 262° F. and a drying point of 292° F. The epoxy "Admex 711" is a polymeric epoxy vinyl plasticizer made by the Archer-Daniels-Midland Company, Minneapolis, Minnesota. Further information on these and other compatible plasticizers may be found at pages 638–654 of the September 1958 issue (Encyclopedia issue for 1959) of Modern Plastics, volume 36, Number 1A, copyright 1958 by Plastics Catalogue Corp., Bristol, Connecticut, U.S.A.

Other types of formulations found suitable in the practice of this invention are those having a base vinylchloride-acetate copolymer mixed with solvents selected from the group consisting of ketones and fatty acid esters. Other adhesive formulations which are also characterized by the non-activatability under the conditions of folding and use described, and are activatable in response to the application of a controlled actor thereto, as exemplified by the aforementioned heat-sealable adhesives, will readily occur to the artisan confronted with this teaching and as such may be employed in and are intended within the spirit of this disclosure.

As a further variation of the present disclosure, fabric blank 11 may be formed from one of the newer synthetic fabrics. Where such fabrics include a significant portion of cellulosic material, the procedure to be followed is as previously described.

When, however, such fabrics do not have a cellulosic base such, for example, as nylon, glass fabric and the like, it is found essential when employing a plasticized polyvinyl chloride adhesive formulation to precede the steps of zone coating by a preliminary coating with a suitable primer such, for example, as the "B. F. Goodrich primer," containing a blend of phenolic resin and other resinous or rubberlike materials, sold by the B. F. Goodrich Company of Akron, Ohio.

Another important feature of the present invention which is especially significant in further enhancing the wear resistance, water resistance, and handling properties of our pouch will now be described.

A mail pouch, preferably formed in the fashion described, is coated with a thin layer, from about 1 to about 5 mils thick, of a formulation containing, exclusive of its diluent, from about 50 to about 80 percent and more preferably from about 55 to about 70 percent (by weight of solids) vinyl chloride resins, and the remainder, that is, from about 50 to about 20 percent (by weight of solids) of a plasticizer. A diluent such, for example, as aromatic hydrocarbons, aliphatic hydrocarbons, ketones, and the like may be employed to enhance handling.

The quantity of diluent employed is generally based upon the viscosity of formulation desired and may be varied by choice. The layer is dried to expel the diluent, as by air drying, and further heated, preferably to a temperature of about 120° F. to about 200° F. for a period, varying according to exact formulation chosen, sufficient to fuse and cure the composition to form a tough flexible wear resistant coating.

The choice of a suitable plasticizer for the coating formulation is relatively wide and includes methyl abietate; di-(methylcyclohexyl)adipate; epoxy plasticizers of the type available from Archer-Daniels-Midland Company, Minneapolis, Minnesota, under the trade designation "Admex 711"; decyl amyl phthalate; di-octyl and di-decyl (50-50 blend) phthalates; polyester plasticizers of the type available from Archer-Daniels-Midland under the trademark "Admex 760" and from E. F. Drew and Company, Boonton, New Jersey, under the trade designation "DP-100"; polymeric plasticizers of the type derived from neopentyl glycol and sold under the trade designations "Eastman" NP-10 (by Eastman Chemical Products, Inc., Kingsport, Tennessee) and "Harflex" 300, 325 and 375 (by Wallace and Tiernan, Inc., Harchem Division, Belleville, New Jersey); mixed sebecate adipate ester (sold under the trade designation "Staflex-LA" by Delcy Products Co., Cambridge, Massachusetts); glyceryl tri-acetoxy stearate; and the like.

If desired, the layer of the coating material may be disposed upon fabric blank 11 on the bottom (relative to the drawing) thereof before commencing the disclosed pouch fabrication.

The thin coating enveloping the mail pouch in the manner described provides a pouch having remarkable toughness and wear resistance. For example, a conventional mail pouch formed of duck at 8 ounces per square yard was tested on an abrasion tester and failed after only about 4000-6000 revolutions whereas the present pouch, enveloped in a thin layer of polyvinyl in the manner described, withstood over 40,000 revolutions without failure.

Thus, it becomes apparent from the foregoing that all of the objectives hereinbefore set forth are fulfilled by the present invention to a remarkably unexpected degree. It is, of course, understood that while certain specific embodiments and modifications have been herein described and illustrated, they are done so by way of example only. Thus, such variations, modifications and applications as may readily occur to the skilled artisan from this teaching are intended within the spirit of the present invention, especially as it is defined by the appended claims.

We claim:

1. A mail pouch comprising an integral fabric blank having first, second and third generally rectangular sections folded to define a parallelepipedon storage chamber therebetween having one open end, said second section lying in a first plane and said first and said third sections extending therefrom in normal relationship thereto in generally parallel relationship to each other, said first and third sections each having a main portion and first and second foldable portions folded in planes generally normal to said first plane and to said main portion, the corresponding of said foldable portions of each of said first and third sections engaging each other in overlapping relationship thereto to form a joint, said second section having a main portion and first and second end portions outboard of said main portion and said joints, said end portions being foldable into first and second generally isosceles triangles simultaneously with the folding of said adjacent foldable portions of said first and third sections, each of said triangles having an upper and lower layer; a layer of heat sealable adhesive disposed intermediate said foldable portions in each of said joints and bonded integrally thereto; and another layer of heat sealable adhesive disposed intermediate said upper and lower layer of each of said isosceles triangles in complete surface-to-surface engagement therewith and integrally bonded thereto.

2. A mail pouch comprising an integral canvas blank having first, second and third rectangular sections folded to define a parallelepipedon storage chamber therebetween having one open end, said second section lying in a first plane and said first and said third sections extending therefrom in normal relationship thereto in generally parallel relationship to each other, said first and third sections each having a main portion and first and second foldable portions folded in planes generally normal to said first plane and to said main portion, the corresponding of said foldable portions of each of said first and third sections engaging each other in overlapping relationship thereto to form a joint, said second section having a main portion and first and second end portions outboard of said main portion and said joints, said end portions being foldable into first and second generally isosceles triangles simultaneously with the folding of said adjacent foldable portions of said first and third sections, each of said triangles having an upper and lower layer; a layer of heat sealable adhesive consisting of a plasticized polymer of vinyl chloride disposed intermediate said foldable portions in each of said joints and bonded integrally thereto; and another layer of said heat sealable adhesive disposed intermediate said upper and lower layer of each of said isosceles triangles in complete surface-to-surface engagement therewith and integrally bonded thereto.

3. A mail pouch comprising an integral fabric blank having first, second and third rectangular sections folded to define a parallelepipedon storage chamber therebetween having one open end, said second section lying in a first plane and said first and third sections extending therefrom in normal relationship thereto in generally parallel relationship to each other, said first and third sections each having a main portion and first and second foldable portions folded in planes generally normal to said first plane and to said main portion, the corresponding of said foldable portions of each of said first and third sections engaging each other in overlapping relationship thereto to form a joint, said second section having a main portion and first and second end portions outboard of said main portion and said joints, said end portions being foldable into first and second generally isosceles triangles simultaneously with the folding of said adjacent foldable portions of said first and third sections, each of said triangles having an upper and lower layer; a layer of from about 2 to about 7 mils thick of a heat sealable adhesive disposed intermediate said foldable portions in each of said joints and bonded integrally thereto; another layer of from about 2 to about 7 mils thick of said heat sealable adhesive disposed intermediate said upper and lower layer of each of said isosceles triangles and integrally bonded thereto in complete surface-to-surface engagement therewith; and a layer of at least 1 but not more than 2 mils thick of a thermoplastic plasticized vinyl chloride containing, by weight of solids, from about 50 to about 80 percent vinyl chloride resins and a remainder of compatible plasticizer and solvent disposed over the entire external surface of said folded blank.

4. A mail pouch comprising an integral fabric blank folded to define a laterally enclosed storage chamber having a closed bottom and an open top, said chamber having side seams formed of common edges of said blank brought together and integrally secured by a heat sealable adhesive interposed therebetween, said closed bottom having triangular handle means integrally formed therewith and extending outwardly therefrom at each end thereof, each of said handle means being formed of a portion of a common edge of said blank open upon the formation of said seams and lapped inwardly thereto to define a multi-layer generally isosceles triangle in based relationship therewith, said triangle having a layer of heat sealable adhesive interposed intermediate said layers and activated to effect an integral complete surface to surface engagement therebetween, and said open top having closing means secured thereto for selectively opening and closing said chamber.

5. The method of fabricating a mail pouch from an integral fabric blank comprising apportioning an integral rectangularly shaped fabric blank into first, second and third sections, said first and third sections being rectangularly shaped of substantially equal size and having their major dimensions longitudinally of said blank, said second section being rectangularly shaped and intermediate of said first and third sections, said second section being smaller than said first and third sections and having its major dimension transversely of said blank; apportioning said second section into a major portion and two minor portions, one of said minor portions being at each end of said major portions, all of said portions being substantially rectangular in shape; coating a strip adjacent each of the edges of said first section with a layer of a heat sealable adhesive; apportioning each of said minor portions into first and second halves in which a diagonal disposed thereupon defines an inboard and outboard triangle, said inboard triangles in each of said minor portions being adjacent to define a first zone, said outboard triangles of each of said minor portions being spaced to define a second zone; coating the entire area of at least one of said zones with a thin layer of heat sealable adhesive; folding said first and third sections into generally normal relationship to said second section and overlapping the edges of said third section with the edges of said first section to form a joint in which said strips are in intimate engagement therewith; holding said edges in said intimate engagement with each other while simultaneously heating said joints to bring said adhesive strips to heat sealable condition; thereafter cooling said joints to set said adhesive and form an integral adherent bond in said joint; folding each of said minor portions into a generally triangular shape by overlaying the outboard triangle of each of said halves on the inboard triangle of each of said halves and bringing each of said zones of each of said portions into registry with each other; holding said zones in said registry with each other while simultaneously heating said shapes to bring said adhesive to heat sealable condition; and cooling said shapes to set said adhesive and form an integral adherent bond in said shape.

6. The method of fabricating a mail pouch from an integral fabric blank comprising apportioning an integral rectangularly shaped fabric blank into first, second and third sections, said first and third sections being rectangularly shaped of substantially equal size and having their major dimensions longitudinally of said blank, said second section being rectangularly shaped and intermediate of said first and third sections, said second section being smaller than said first and third sections and having its major dimension transversely of said blank; apportioning said second section into a major portion and two minor portions, one of said minor portions being at each end of said major portion, all of said portions being substantially rectangular in shape; coating a strip adjacent each of the edges of said first section with a layer of a formulation containing a plasticized polymer which when heat activated provides a bond capable of withstanding a pull of at least 10 pounds per inch; apportioning each of said minor portions into first and second halves in which a diagonal disposed thereupon defines an inboard and outboard triangle, said inboard triangles in each of said minor portions being adjacent to define a first zone, said outboard triangles of each of said minor portions being spaced to define a second zone; coating the entire area of at least one of said zones with a thin layer of said formulation; folding said first and third sections into generally normal relationship to said second section and overlapping the edges of said third section with the edges of said first section to form a joint in which said strips are in intimate engagement therewith; holding said edges in said intimate engagement with each other while simultaneously heating said joints to bring said formulation to heat sealable condition; thereafter cooling said joints to set said formulation and form an integral adherent bond in said joint; folding each of said minor portions into a generally triangular shape by overlaying the outboard triangle of each of said halves on the inboard triangle of each of said halves and bringing each of said zones of each of said portions into registry with each other; holding said zones in said registry with each other while simultaneously heating said shapes to bring said adhesive to heat sealable condition; and thereafter cooling said shapes to set said formulation and form an integral adherent bond in said shape.

7. The method of fabricating a mail pouch from an integral fabric blank comprising apportioning an integral rectangularly shaped fabric blank into first, second and third sections, said first and third sections being rectangularly shaped of substantially equal size and having their major dimensions longitudinally of said blank, said second section being rectangularly shaped and intermediate of said first and third sections, said second section being smaller than said first and third sections and having its major dimension transversely of said blank; apportioning said second section into a major portion and two minor portions one of said minor portions being at each end of said major portion, all of said portions being substantially rectangular in shape; coating a strip adjacent each of the edges of said first section with a layer of a heat sealable adhesive containing a plasticized polymer of vinyl chloride; apportioning each of said minor portions into first and second halves in which a diagonal disposed thereupon defines an inboard and outboard triangle, said inboard triangles in each of said minor portions being adjacent to define a first zone, said outboard triangles of each of said minor portions being spaced to define a second zone; coating the entire area of at least one of said zones with a thin layer of a heat sealable adhesive containing a plasticized polymer of vinyl chloride; folding said first and third sections into generally normal relationship to said second section and overlapping the edges of said third section with the edges of said first section to form a joint in which said strips are in intimate engagement therewith; holding said edges in said intimate engagement with each other while simultaneously heating said joints to bring said strips to heat sealable condition; thereafter cooling said joints to set said adhesive and form an integral adherent bond in said joint; folding each of said minor portions into a generally triangular shape by overlaying the outboard triangle of each of said halves on the inboard triangle of each of said halves and bringing each of said zones of each of said portion into registry with each other; holding said zones in said registry with each other while simultaneously heating said shape to bring said adhesive to heat sealable condition; and cooling said shapes to set said adhesive and form an integral adherent bond in said shapes.

8. The method of fabricating, from an integral rectangularly shaped fabric blank, a mail pouch having a parallelepipedon storage area and handle means integrally formed therewith comprising; apportioning an integral rectangularly shaped fabric blank into first, second and third sections extending axially thereof, said fabric blank being uncalendered and having two ends in generally parallel spaced relationship to each other and normal to the longitudinal axis of said blank, said first and said third sections extending axially inwardly respectively from said respective ends of said blank into contiguous relationship with said second section, said section being symmetrically disposed about a line established midway between and parallel to said ends and extending substantially normal to said longitudinal axis of said blank; sub-dividing said second section into a major and two minor rectangularly shaped portions, said major portion being interposed between said minor portions and generally symmetrical with said longitudinal axis, each of said minor portions extending between an adjacent end of said major portion and the edges of said blank; coating a strip of a heat sealable adhesive having a thickness of from about 2 to about 7 mils adjacent the edges of said first section; coating the entire area of at least half of each of said minor portions disposed on each side of said line with a layer of heat sealable adhesive having a thickness of about 2 to about 7 mils thick; folding said third section into generally normal relationship with said second section and overlapping adjacent halves of said minor portions to form a first generally triangular fold at each minor portion, each of said folds having said layer of heat sealable adhesive therebetween; heating said first triangular folds to a temperature sufficient to render in heat sealing condition said heat sealable adhesive to form a complete surface to surface intimate bond between layers of said folds, said temperature being at least 350° F. and not more than 425° F.; folding said first section into generally normal relationship with said second section and overlapping adjacent halves of said minor portions to form a second generally triangular fold for each minor portion contiguous with said first fold, each of said second folds having said layer of heat sealable adhesive therebetween; heating said second triangular folds to a temperature sufficient to render in heat sealing condition said heat sealable adhesive to form a complete surface to surface intimate bond between layers of said folds; lapping said coated strips on said first section over the edges of said third section to form a first and second seam therewith comprising two fabric layers having said layer of a heat sealable adhesive intermediate thereof; heating said first and second seams to a temperature sufficient to render in heat sealing condition said heat sealable adhesive to form a complete surface to surface intimate bond between said fabric layers in said seams, said temperature being at least about 350° F. and not more than 425° F.; and coating the external surface of said blank thus manipulated with a layer of from at least one to about two mils thick of a thermoplastic material.

References Cited in the file of this patent
UNITED STATES PATENTS

| | | |
|---|---|---|
| 670,360 | Lawler | Mar. 19, 1901 |
| 1,826,646 | Blake | Oct. 6, 1931 |
| 2,047,095 | Booth | July 7, 1936 |
| 2,459,955 | Morrison | Jan. 25, 1949 |
| 2,706,699 | Plansoen | Apr. 19, 1955 |

OTHER REFERENCES

"Modern Plastics" Encyclopedia, 1948 ed., published by Plastics Catalogue Corp.; New York, pages 633–638 of interest, copy in Div. 29.